Jan. 14, 1936. L. HAND 2,027,906
AIR FILTER
Filed Aug. 9, 1935 2 Sheets-Sheet 1
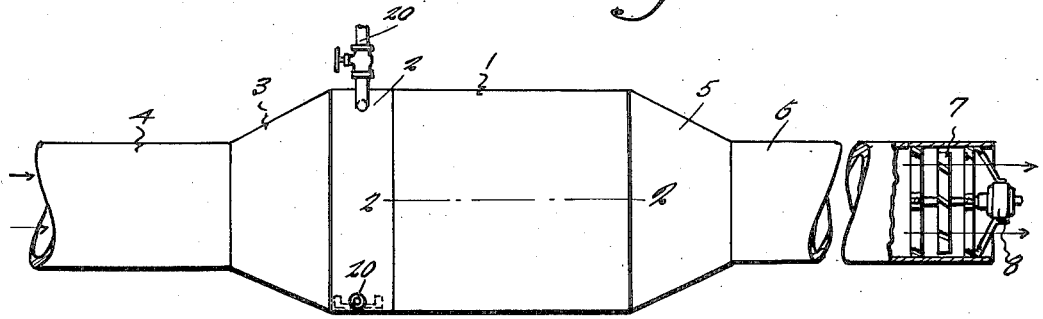
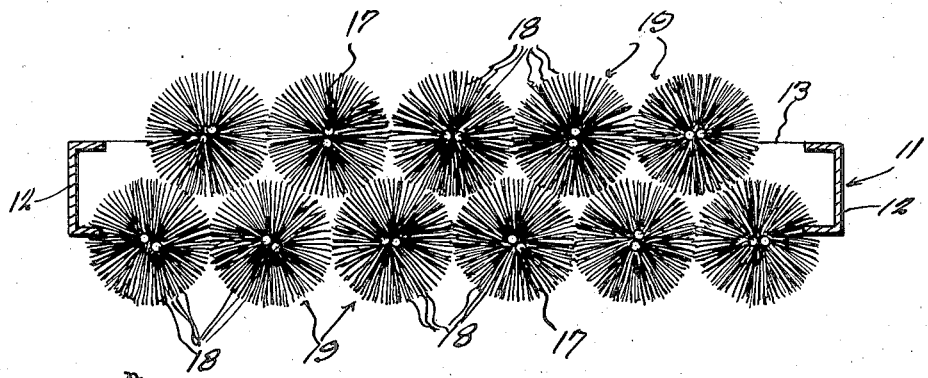
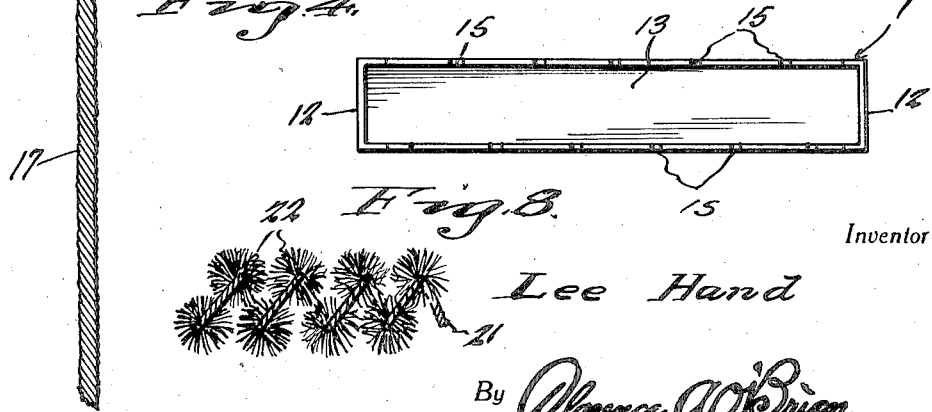
Inventor
Lee Hand
By Clarence A. O'Brien
Attorney Jan. 14, 1936.  L. HAND  2,027,906
AIR FILTER
Filed Aug. 9, 1935  2 Sheets-Sheet 2
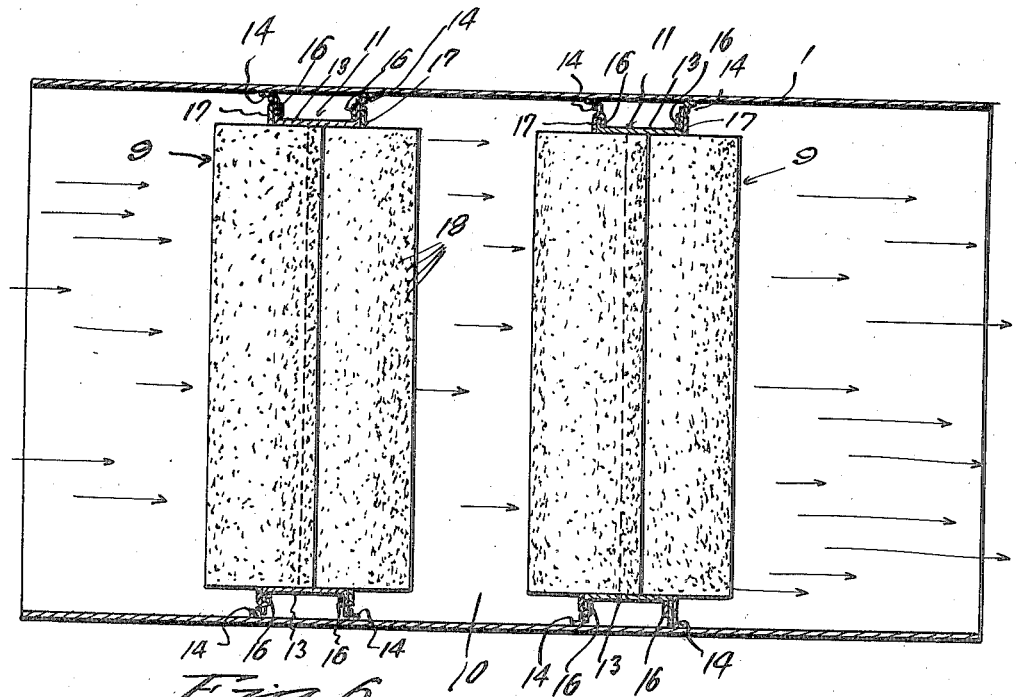
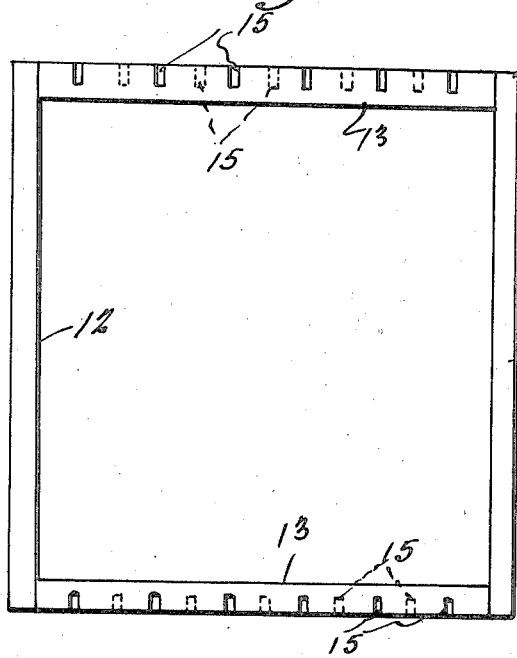
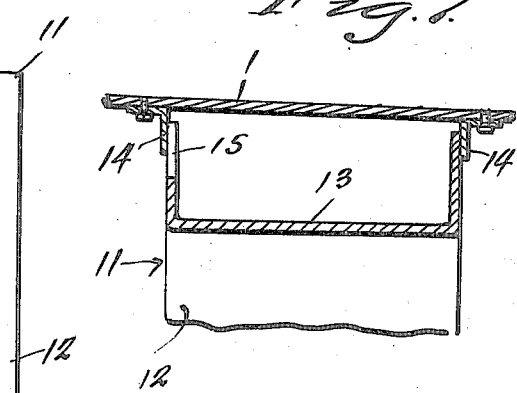
Inventor
Lee Hand
By Clarence A. O'Brien
Attorney Patented Jan. 14, 1936

2,027,906

UNITED STATES PATENT OFFICE 2,027,906

AIR FILTER

Lee Hand, St. Louis, Mo.

Application August 9, 1935, Serial No. 35,535

2 Claims. (Cl. 183—44)

The present invention relates to new and useful improvements in air filters for various purposes and has for one of its important objects to provide a device of this character of the type including a plurality of spaced cleaning or filtering units, the construction and arrangement being such that said units may be expeditiously removed when desired for cleaning, repairing, replacement, or for any other purpose.

Another very important object of the invention is to provide an air filter of the character described comprising a plurality of filtering or cleaning units, each of said units including a plurality of brushes or filtering elements, together with novel means for mounting said elements in position.

Other objects of the invention are to provide an air filter of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of an air filter constructed in accordance with the present invention, one end portion of the discharge pipe being broken away in section to expose the suction fan and motor.

Figure 2 is a vertical sectional view, taken substantially on the line 2—2 of Figure 1.

Figure 3 is a view in horizontal section through one of the filtering units.

Figure 4 is a detail view in side elevation of a portion of one of the bristle supporting cores.

Figure 5 is a top plan view of one of the frames.

Figure 6 is a view in front elevation of one of the frames.

Figure 7 is a detail view in vertical section through an upper portion of the device, showing the means for securing the removable frames in position in the casing.

Figure 8 is a fragmentary view in top plan of a modification.

Referring now to the drawings in detail, it will be seen that the reference numeral 1 designates a casing of polygonal cross section, said casing being open at its ends and being provided, at one end, with an extension 2. A substantially conical reducer 3 connects the extension 2 with an air intake pipe 4 and a similar reducer 5 connects the other end of the casing 1 with a discharge pipe 6. Mounted in the outlet end portion of the discharge pipe 6 is a suction fan 7 which is driven by an electric motor 8.

Mounted in the casing 1 is a pair of filtering units designated generally by the reference numeral 9, said units being removable and spaced longitudinally from each other in said casing 1 in a manner to provide a chamber 10 therebetween. Each unit 9 comprises a metallic frame 11 of suitable metal, said frame 11 including side channel members 12 and upper and lower channel members 13. It will be observed that the base portions of the channel members 12 are arranged outermost, while the corresponding portions of the channel members 13 are disposed inwardly. The frame 11 is retained in position in the casing 1 through the medium of removable angular lugs 14 (see Figure 7).

The flanges of the frame members 13 have formed therein staggered notches or slots 15. The notches 15 are for the reception of hooks 16 on the upper and lower ends of twisted together wire cores 17. Spirally arranged bristles 18 project from the cores 17. It will thus be seen that the cores 17 and bristles 18 constitute cleaning elements which are designated generally by the reference numeral 19. As best seen in Figure 3 of the drawings, the cleaning elements 19 are arranged in staggered, overlapping relation. The reference numeral 20 designates a water spray pipe which may be provided in the extension 2.

In the modified form of the invention illustrated in Figure 8 of the drawings, a single, continuous wire core 21 is used, said core having mounted thereon at spaced points bristles 22. In this arrangement, the single, continuous core 21 is wound around the frame 11 and engaged in the notches 15, the portions of said core 21 which extend across the members 13 being free of bristles.

It is thought that the operation of the invention will be readily apparent from a consideration of the foregoing, particularly to those skilled in the art to which the device pertains. Air entering the casing 1, passes through the first unit 9 into the mixing chamber 10 and then passes through the second unit 9 and discharges through the pipe 6, being drawn through said pipe 6 by the suction fan 7. If the spraying apparatus 20 is in operation, the air will be moisture-laden when it reaches the first unit 9. If desired, the first or primary unit 9 may be saturated with a suitable oil in a manner to cause dust and any other foreign matter in the air to more readily adhere to the bristles 18. As hereinbefore stated, the units 9 may be removed for cleaning or other purposes.

It is believed that the many advantages of an air filter constructed in accordance with the present invention will be readily understood, and although preferred embodiments of the device are as illustrated and described, it is to be understood that further modifications or changes in the details of construction may be resorted to which will fall within the scope of the invention as claimed.

What is claimed is:—

1. An air filter of the class described comprising an elongated casing of polygonal cross section open at its ends, and filtering units mounted at longitudinally spaced points in said casing, each unit including a removable frame comprising substantially channel-shaped side, top and bottom members, said top and bottom members having staggered notches therein, spirally twisted wire cores mounted vertically in the frame and terminating, at their ends, in hooks engaged in the notches, and bristles mounted on the cores and projecting therefrom.

2. An air filter comprising a casing, a frame mounted in the casing, a plurality of cylindrical shaped filtering units mounted in the frame, said units being mounted in a pair of rows traversing the casing, with the units of one row in lateral offset relation with respect to the units of the other row.

LEE HAND.